(12) United States Patent
Attar et al.

(10) Patent No.: US 9,726,752 B2
(45) Date of Patent: *Aug. 8, 2017

(54) POSITION LOCATION FOR WIRELESS COMMUNICATION SYSTEMS

(71) Applicant: QUALCOMM Incorporated, San Diego, CA (US)

(72) Inventors: Rashid Ahmed Akbar Attar, San Diego, CA (US); Durga Prasad Malladi, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,689

(22) Filed: Nov. 8, 2012

(65) Prior Publication Data

US 2013/0065610 A1 Mar. 14, 2013

Related U.S. Application Data

(63) Continuation of application No. 12/113,810, filed on May 1, 2008, now Pat. No. 8,326,318.

(Continued)

(51) Int. Cl.
*G01S 5/10* (2006.01)
*H04W 64/00* (2009.01)
(Continued)

(52) U.S. Cl.
CPC .............. *G01S 5/10* (2013.01); *G01S 5/0205* (2013.01); *G01S 5/14* (2013.01); *G01S 13/876* (2013.01); *G01S 19/46* (2013.01); *H04W 64/00* (2013.01); *G01S 2013/466* (2013.01); *H04W 72/0413* (2013.01); *H04W 76/048* (2013.01); *H04W 88/08* (2013.01)

(58) Field of Classification Search
CPC ............................... H04W 8/12; G01S 5/0205
USPC ....... 455/456.1–456.6, 424, 423, 561, 562.1, 455/452.1, 457, 422.1, 571, 575.1, 450, 455/466, 447, 444–446, 442, 453; 342/357.06, 357.08, 539.13

See application file for complete search history.

(56) References Cited

U.S. PATENT DOCUMENTS

| 4,829,593 A | 5/1989 | Hara |
| 5,900,838 A * | 5/1999 | Khan et al. .................. 342/457 |

(Continued)

FOREIGN PATENT DOCUMENTS

| CN | 1257387 A | 6/2000 |
| CN | 1468023 A | 1/2004 |

(Continued)

OTHER PUBLICATIONS

European Search Report—EP12158435, Search Authority—The Hague Patent Office—Apr. 27, 2012.

(Continued)

*Primary Examiner* — Charles Appiah
*Assistant Examiner* — Margaret G Mastrodonato
(74) *Attorney, Agent, or Firm* — Thomas A. Jolly

(57) ABSTRACT

The subject matter disclosed herein relates to position location in a wireless communication system, and may more particularly relate to position location for a mobile station.

14 Claims, 10 Drawing Sheets

Related U.S. Application Data

(60) Provisional application No. 60/915,432, filed on May 1, 2007.

(51) Int. Cl.

| | | |
|---|---|---|
| *G01S 5/02* | (2010.01) | |
| *G01S 5/14* | (2006.01) | |
| *G01S 13/87* | (2006.01) | |
| *G01S 19/46* | (2010.01) | |
| *H04W 72/04* | (2009.01) | |
| *H04W 88/08* | (2009.01) | |
| *H04W 76/04* | (2009.01) | |
| *G01S 13/46* | (2006.01) | |

(56) References Cited

U.S. PATENT DOCUMENTS

| | | |
|---|---|---|
| 5,970,414 A | 10/1999 | Bi et al. |
| 5,974,323 A | 10/1999 | Doner |
| 6,021,330 A | 2/2000 | Vannucci |
| 6,295,024 B1 | 9/2001 | King et al. |
| 6,329,948 B1 | 12/2001 | Ishikawa |
| 6,353,744 B1 | 3/2002 | Wu et al. |
| 6,493,331 B1 | 12/2002 | Walton et al. |
| 6,545,997 B1 | 4/2003 | Boehnke et al. |
| 6,590,881 B1 | 7/2003 | Wallace et al. |
| 6,831,957 B2 | 12/2004 | Chen |
| 6,888,805 B2 | 5/2005 | Bender et al. |
| 7,016,692 B2 | 3/2006 | Rajkotia |
| 7,031,722 B2 * | 4/2006 | Naghian .............. G01S 5/06 342/457 |
| 7,068,683 B1 | 6/2006 | Lundby et al. |
| 7,471,241 B1 | 12/2008 | Yang |
| 7,519,136 B2 | 4/2009 | Qi et al. |
| 7,528,772 B2 | 5/2009 | Ruutu et al. |
| 7,565,125 B2 | 7/2009 | Audinot et al. |
| 7,570,962 B2 | 8/2009 | Chou |
| 7,580,482 B2 | 8/2009 | Endres et al. |
| 7,721,236 B2 | 5/2010 | Hwang et al. |
| 7,893,873 B2 | 2/2011 | Black et al. |
| 7,990,317 B2 | 8/2011 | Davis et al. |
| 8,068,056 B2 | 11/2011 | Wachter et al. |
| 8,094,595 B2 | 1/2012 | Montojo et al. |
| 8,174,446 B2 * | 5/2012 | Davis et al. .............. 342/387 |
| 8,326,318 B2 | 12/2012 | Attar et al. |
| 8,412,227 B2 | 4/2013 | Edge et al. |
| 2001/0034236 A1 | 10/2001 | Tong et al. |
| 2002/0025822 A1 | 2/2002 | Hunzinger |
| 2002/0065075 A1 | 5/2002 | Kangas et al. |
| 2002/0183075 A1 | 12/2002 | Fauconnier |
| 2003/0026225 A1 | 2/2003 | Ogino et al. |
| 2003/0112857 A1 | 6/2003 | Cleveland |
| 2003/0190919 A1 * | 10/2003 | Niemenmaa .............. 455/456.1 |
| 2003/0214908 A1 | 11/2003 | Kumar et al. |
| 2004/0067759 A1 | 4/2004 | Spirito et al. |
| 2004/0072579 A1 | 4/2004 | Hottinen |
| 2004/0092233 A1 | 5/2004 | Rudrapatna |
| 2004/0132443 A1 | 7/2004 | Klein et al. |
| 2004/0135721 A1 | 7/2004 | Hoven et al. |
| 2004/0151264 A1 | 8/2004 | Montojo et al. |
| 2004/0166873 A1 | 8/2004 | Simic et al. |
| 2004/0203921 A1 | 10/2004 | Bromhead et al. |
| 2005/0046613 A1 | 3/2005 | Ruutu et al. |
| 2005/0054349 A1 | 3/2005 | Balachandran et al. |
| 2005/0062530 A1 | 3/2005 | Bardsley et al. |
| 2005/0101277 A1 | 5/2005 | Narayan et al. |
| 2005/0186948 A1 | 8/2005 | Gallagher et al. |
| 2005/0232199 A1 | 10/2005 | Liu et al. |
| 2006/0079193 A1 | 4/2006 | Sato et al. |
| 2006/0199577 A1 | 9/2006 | Ramakrishna et al. |
| 2006/0209670 A1 | 9/2006 | Gorokhov et al. |
| 2006/0280200 A1 | 12/2006 | Lane et al. |
| 2007/0004430 A1 | 1/2007 | Hyun et al. |
| 2007/0063897 A1 | 3/2007 | Matsuda |
| 2007/0135170 A1 | 6/2007 | Khan et al. |
| 2007/0149217 A1 | 6/2007 | Balachandran et al. |
| 2007/0189282 A1 | 8/2007 | Lohr et al. |
| 2007/0229355 A1 | 10/2007 | Han et al. |
| 2007/0298793 A1 | 12/2007 | Dawson |
| 2008/0132247 A1 | 6/2008 | Anderson |
| 2008/0151743 A1 | 6/2008 | Tong et al. |
| 2008/0161011 A1 | 7/2008 | Babin |
| 2008/0267137 A1 | 10/2008 | Dabak et al. |
| 2009/0003495 A1 | 1/2009 | Wu et al. |
| 2009/0124265 A1 | 5/2009 | Black et al. |
| 2009/0280836 A1 | 11/2009 | Chou |
| 2010/0105405 A1 | 4/2010 | Vujcic |
| 2011/0111751 A1 | 5/2011 | Markhovsky et al. |
| 2011/0254735 A1 * | 10/2011 | Davis et al. .............. 342/387 |
| 2013/0217401 A1 | 8/2013 | Edge et al. |
| 2014/0029705 A1 | 1/2014 | Wu et al. |
| 2014/0038645 A1 | 2/2014 | Wu et al. |
| 2014/0064243 A1 | 3/2014 | Ma et al. |

FOREIGN PATENT DOCUMENTS

| | | |
|---|---|---|
| CN | 1926445 A | 3/2007 |
| EP | 0893920 A2 | 1/1999 |
| EP | 0893930 A2 | 1/1999 |
| EP | 1014103 | 6/2000 |
| EP | 1093318 A2 | 4/2001 |
| EP | 1043861 B1 | 6/2002 |
| JP | 5211470 A | 8/1993 |
| JP | 10285640 A | 10/1998 |
| JP | 11122656 A | 4/1999 |
| JP | 2000180186 | 6/2000 |
| JP | 2001051042 A | 2/2001 |
| JP | 2001083229 A | 3/2001 |
| JP | 2001177469 A | 6/2001 |
| JP | 2002516519 A | 6/2002 |
| JP | 2002281540 A | 9/2002 |
| JP | 2003047044 A | 2/2003 |
| JP | 2003078947 A | 3/2003 |
| JP | 2003520518 A | 7/2003 |
| JP | 2004512788 A | 4/2004 |
| JP | 2004253899 A | 9/2004 |
| JP | 2004535724 A | 11/2004 |
| JP | 2007020162 A | 1/2007 |
| JP | 2007529947 A | 10/2007 |
| WO | 9815149 A1 | 4/1998 |
| WO | 9950968 A1 | 10/1999 |
| WO | WO-9960739 A1 | 11/1999 |
| WO | WO-0152566 | 7/2001 |
| WO | WO-0235877 A1 | 5/2002 |
| WO | 2007004788 A1 | 1/2007 |
| WO | 2007013850 A2 | 2/2007 |
| WO | 2007018408 A1 | 2/2007 |
| WO | 2007025138 A2 | 3/2007 |

OTHER PUBLICATIONS

International Search Report—PCT/US08/062308, International Search Authority—European Patent Office, Nov. 20, 2008.
Partial International Search Report—PCT/US2008/062308, International Searching Authority—European Patent Office—Sep. 26, 2008.
Written Opinion—PCT/US08/062308, International Search Authority—European Patent Office, Nov. 20, 2008.
"3rd Generation Partnership Project; Technical Specification Group Radio Access Network; Services provided by the physical layer (Release 1999)", 3GPP Draft; 25.302-V3.7.0, 3rd Generation Partnership Project (3GPP), Mobile Competence Centre; 650, Route Des Lucioles; F-06921 Sophia-Antipolis Cedex; France, vol.RAN WG2, No. V3.7.0 Sophia Antipolis, France; Jan. 24, 2001, Jan. 24, 2001 (Jan. 24, 2001), pp. 1-58, XP050117065.

* cited by examiner

POSITION LOCATION FOR WIRELESS COMMUNICATION SYSTEMS

CLAIM OF PRIORITY UNDER 35 U.S.C. §119

The present patent application is a continuation of U.S. patent application Ser. No. 12/113,810, entitled "POSITION LOCATION FOR WIRELESS COMMUNICATION SYSTEMS", filed May 1, 2008, pending, which claims priority to U.S. Provisional Application No. 60/915,432, entitled "A METHOD AND APPARATUS OF USING NON-SERVING SECTORS OF ACCESS TERMINAL TO DETERMINE LOCATION, filed on May 1, 2007, expired, all of the foregoing assigned to the assignee of currently claimed subject matter and herein incorporated by reference in their entirety. Furthermore, U.S. application Ser. No. 12/113,810 was concurrently filed with U.S. patent application Ser. No. 12/113,903, entitled "Enhanced Pilot Signal Receiver," filed on May 1, 2008; and U.S. patent application Ser. No. 12/113,900, entitled "Enhanced Pilot Signal," filed on May 1, 2008, both of which are assigned to the assignee of currently claimed subject matter and incorporated by reference in their entirety.

BACKGROUND

Field

The subject matter disclosed herein may relate to position location for wireless communication systems, and may more particularly relate to position location for mobile stations in wireless communication systems.

Information

To gather information in order to determine a position location, a mobile device may receive timing signals from a satellite positioning system (SPS), such as, for example, a Global Positioning System (GPS). Such information may be utilized by the mobile station to determine the position location, or the mobile station may provide the information to the network entity for position location determination. However, under some circumstances, the mobile station may encounter difficulties in receiving the timing signals. For example, difficulties may be experienced if the mobile station is positioned inside of a building, or in a tunnel, etc. In other circumstances, the mobile station may not incorporate an SPS receiver, for example, and so may not be able to gather timing information from the SPS.

SUMMARY

In one aspect, propagation delay information may be received from one or more non-serving cells of a cellular network, and a position location for a mobile station may be determined based, at least in part, on the propagation delay information received from the one or more non-serving cells and on position locations of the one or more non-serving cells. In another aspect, a position location pilot signal may be transmitted by a base station, and propagation delay information may be transmitted from the base station to the mobile station. A position location may be determined for the mobile station based, at least in part, on the propagation delay information received from the base station and based, at least in part, on a known position location of the base station.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
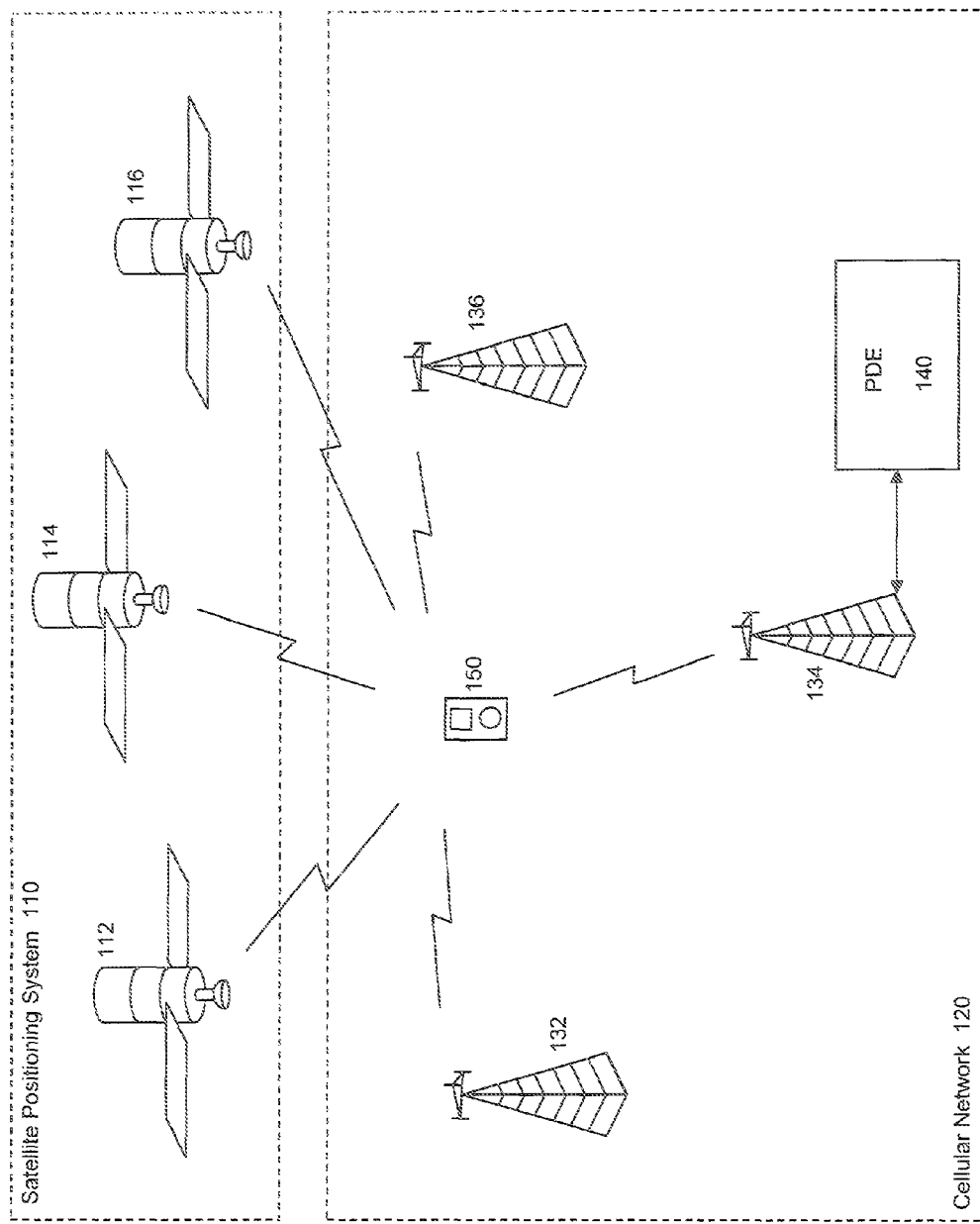
FIG. 1 is a block diagram of examples of a satellite positioning system (SPS) and a cellular network.

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Wireless communication techniques and/or location determination techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement one or more radio access technologies (RATs) such as cdma2000, Wideband-CDMA (W-CDMA), and Universal Terrestrial Radio Access (UTRA), to name just a few radio technologies. Here, cdma2000 may include technologies implemented according to IS-95, IS-2000, and IS-856 standards. UTRA may include Wideband-CDMA (W-CDMA) and Low Chip Rate (LCR). A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. As used herein, the term "LTE specification" or the like is intended to refer to LTE Terrestrial Radio Access Network technology specifications, included in 3GPP, Release 8, plus any subsequent updates or modifications thereto.

Various aspects described below are presented in connection with LTE implementations. However, this is merely an example wireless communication system, sometimes referred to as an air interface, and the scope of claimed subject matter is not limited in this respect. Also, as used herein, the terms "networks" and "systems" may be used interchangeably. Further, the terms "wireless communication system" and "cellular network" may be used herein interchangeably.

In one example, a device and/or system may estimate its position location based, at least in part, on signals received from satellites. In particular, such a device and/or system may obtain "pseudorange" measurements comprising approximations of distances between associated satellites and a navigation satellite receiver. A pseudorange measurement may differ from a range measurement in that the pseudorange measurement may contain an additive term due to an unknown clock bias in the navigation satellite receiver. Because the pseudorange measurement may be derived by comparing a time of arrival of a received satellite signal to a local clock reference in the receiver, any bias of the local clock may result in a pseudorange offset. In a particular example, such a pseudorange may be determined at a receiver that is capable of processing signals from one or more satellites as part of a Satellite Positioning System (SPS). Such an SPS may comprise, for example, a Global Positioning System (GPS), Galileo, Glonass, to name a few, or any SPS developed in the future. To determine its position location, a mobile station such as a satellite navigation receiver may obtain pseudorange measurements to three or more satellites as well as their positions at time of transmitting. If a receiver is able to obtain pseudorange measurements from more than one satellite, the offset due to clock bias may be common among the pseudorange measurements, because the clock bias is common. Therefore, the clock bias may represent a single unknown that can be calculated, and the satellite receiver's position location may be determined if a pseudorange measurement associated with a fourth satellite is also available. Knowing the satellite's orbital parameters, these positions can be calculated for a point in time. A pseudorange measurement may then be determined based, at least in part, on the time a signal travels from a satellite to the receiver, multiplied by the speed of light. While techniques described herein may be provided as implementations of position location determination in a GPS and/or Galileo types of SPS as specific illustrations, it should be understood that these techniques may also apply to other types of SPS, and that claimed subject matter is not limited in this respect.

In another aspect, a device and/or system may estimate its location based, at least in part, on signal propagation delay information gathered through communications with one or more base stations in a cellular network and further based, at least in part, on known position locations of the one or more base stations. As used herein, the term "propagation delay information" is meant to include any information related to propagation times for signals, such as between a mobile station and a base station. Such information may comprise round trip delay estimates, for example. Such information may further comprise, for another example, information related to an observed time difference of arrival for signals between different base stations and the mobile station, for example. For another example, such propagation delay information may comprise information related to downlink timing adjustments. However, these are merely examples of propagation delay information types, and the scope of claimed subject matter is not limited in these respects.

Further, as used herein, the term "known position location" as it relates to base stations in a cellular network is meant to include any information that may identify physical locations of the base stations. For one example, "known position location" information for one or more base stations may be stored in a position determination entity in a cellular network, and/or may be stored in any of a wide range of other resources in the cellular network, as more fully described below. For an additional example, "known position location" information for one or more base stations may be stored in a mobile station. Further, for an example, "known position location" may comprise longitude and latitude, and may for another example comprise altitude information. However, these are merely examples of "known position location", and the scope of claimed subject matter is not limited in this respect.

Possible types of cellular networks include, but are not limited to, those wireless communication systems mentioned above. Systems compliant with and/or compatible with the LTE specification are example cellular systems that may be used in gathering information to determine a position location. Also, in another aspect, a device and/or system may estimate its location based, at least in part, on information received from an SPS or a cellular network.

FIG. 1 is a diagram depicting an example cellular network 120 and an example satellite positioning system (SPS) 110. In an aspect, SPS 110 may comprise a number of satellites, for example satellites 112, 114, and 116. For an example, SPS 110 may comprise a GPS, although the scope of claimed subject matter is not limited in this respect. Also for this example, cellular network 120 may transmit and/or receive signals that are compliant with and/or compatible with the LTE specification, although again, the scope of claimed subject matter is not limited in this respect. As used herein, the term "LTE compliant cellular network" or the like refer to a cellular system that may transmit and/or receive signals compliant with and/or compatible with the LTE specification. In an aspect, cellular network 120 may implement a subset of protocols compliant with and/or compatible with the LTE specification, and/or may implement modifications thereto. For one example, cellular network 120 may comprise base stations 132, 134, and 136. Of course, other examples may include additional numbers of base stations, and the configuration of base stations depicted in FIG. 1 is merely an example configuration. Further, as used herein, the term "base station" is meant to include any wireless communication station and/or device typically installed at a fixed location and used to facilitate communication in a cellular network. In another aspect, base stations may be included in any of a range of electronic device types. For one example, an access point may include a base station.

As used herein, the term "mobile station" (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processor and/or computing platform adapted to perform functions controlled by machine-readable instructions.

In one or more aspects, mobile station 150 may communicate with one or more of satellites 112, 114, and 116, as well as with one or more of base stations 132, 134, and 136. For example, mobile station 150 may receive signal propagation delay information from one or more of the satellites and/or base stations. However, as discussed previously, in some circumstances timing signals from an SPS may not be available and/or may not be desirable. In such a circumstance, mobile station 150 may gather propagation delay information through communication with one or more of base stations 132, 134, and/or 136. Mobile station 150 may calculate a position location for the mobile station based, at least in part, on the propagation delay information received through communication with one or more of base stations 132, 134, and/or 136, and further based, at least in part, on known position locations of the base stations. Examples of measurements based on propagation delay information are provided in more detail below.

In another aspect, position location determination calculations may be performed by a network entity such as, for example, position determination entity 140 depicted in FIG. 1, rather than at mobile station 150. Such a calculation may be based, at least in part, on information gathered by mobile station 150 from one or more of base stations 132, 134, and/or 136. In a further aspect, PDE 140 may transmit the calculated position location to mobile station 150.

In a further aspect, some position location implementations may comprise synchronous systems, and others may comprise asynchronous systems. As used herein, a synchronous system is one that performs position location measurements according to timing reference signals received from an SPS. Such systems may also utilize propagation delay information gathered from a cellular network. Asynchronous systems may lack timing reference signals as provided by an SPS, and may rely on position location measurement information gathered from a cellular network.

As discussed above, in communicating with one or more base stations of a wireless communication system to gather propagation delay information, difficulties may be experienced in some circumstances due to, for example, interference. For example, if mobile station 150 is physically located somewhere within purported range of base stations 132, 134, and 136, mobile station 150 may be able to make a position location determination based on information received from the three base stations. However, if there is interference between signals from one or more of the base stations, mobile station 150 may not be able to adequately communicate with one or more of base stations 132, 134, and/or 136, and it may not be possible to perform a sufficiently accurate position location determination. Similarly, a base station may be located too far from the mobile station and/or the transmission strength of the base station may be insufficient for proper communication with mobile station 150, and again, it may not be possible to perform a sufficiently accurate position location determination. For example, in order to perform trilateration, it may be advantageous for mobile station 150 to receive propagation delay information from at least three base stations, although more accurate position location determinations may be made if information is available from a larger number of cells. Adding to the potential difficulties is that at least some cellular networks such as, for example, those compliant with and/or compatible with the LTE specification, permit a mobile station to be serviced by a maximum of one cell at any particular time.

In an LTE compliant cellular network, mobile station 150 may be permitted to maintain a communication link with a single base station, such as, for example, base station 134. Base station 134 for this example may be referred to as a serving cell, while base stations 132 and 136 may comprise non-serving cells. In a situation where mobile station 150 desires to perform position location determination operations, the information provided by the single serving cell may prove to be inadequate in the absence of additional information from SPS 110.

In an aspect, non-serving cells 132 and 136 may be utilized to gather additional propagation delay information. In a further aspect, techniques to reduce interference may be utilized to enable mobile station 150 to communicate with and receive propagation delay information from a larger number of cells, thereby potentially improving the accuracy of position location determinations. Various techniques for gathering propagation delay information from non-serving cells and/or for reducing interference and/or for increasing signal power for position location measurement signals are described herein by way of non-limiting examples.

Figure 2:
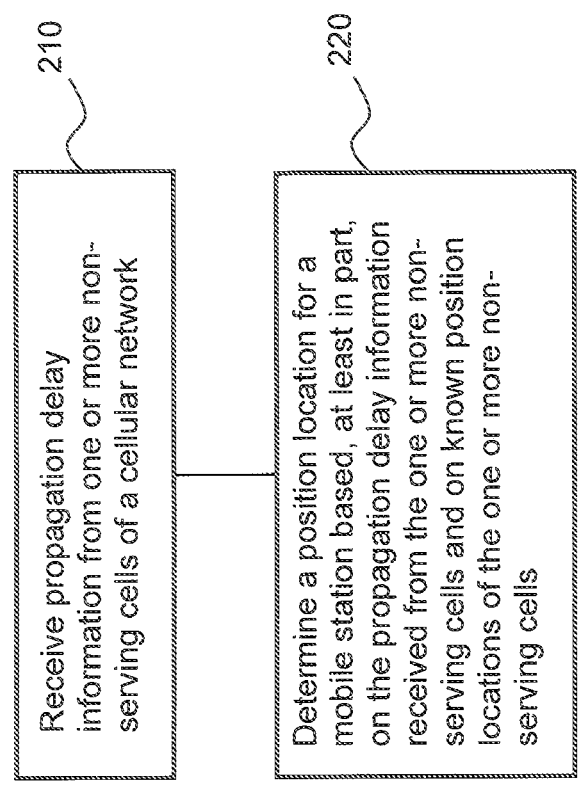
FIG. 2 is a flow diagram of an example method for determining position location for a mobile station.

FIG. 2 is a flow diagram of an example method for determining a position location for a mobile station based, at least in part, on information gathered from one or more non-serving cells. At block 210, propagation delay information may be received from one or more non-serving cells of a cellular network. At block 220, the position location may be determined for the mobile station based, at least in part, on the propagation delay information received from the one or more non-serving cells and further based, at least in part, on known position locations for the one or more non-serving cells. Examples in accordance with claimed subject matter may include all, more than all, or less than all of blocks 210-220. Also, the order of blocks 210-220 is merely an example order. Further, the flow diagram of FIG. 2 is merely an example technique for determining position location for a mobile station, and claimed subject matter is not limited in these respects.

To aid in the description of the example techniques discussed more fully below, a more detailed explanation of mobile station 150 and cellular network 120 is provided. However, mobile station 150 and cellular network 120 depicted in FIG. 1 are merely examples, and the scope of claimed subject matter is not limited in these respects. In an aspect, mobile device 150 and base station 134 (the serving cell for this example) may form part of a Multi-Input/Multi-Output (MIMO) system. In general, mobile station 150 and base station 134 may comprise a plurality of antennae, allowing for the possibility of improved performance over single antenna implementations by way of increased bandwidth and/or increased transmitter power. For an example, one or more data streams may be transmitted by base station 134 over a respective one or more antennae. The data streams may be formatted, coded, and/or interleaved according to a coding scheme specified for the data stream.

Coded data for a data stream may be multiplexed with pilot signals using orthogonal frequency division multiplexing (OFDM) techniques, for an example. The pilot data may comprise a known data pattern to be processed in a specified manner and may be utilized at a receiving device, such as, for this example, mobile station 150 to estimate the channel response. The multiplexed pilot signal and coded data for a data stream may be modulated based at least on part on one of a wide range of possible modulation schemes including, but not limited to, BPSK (binary phase-shift keying), QPSK (Quadrature phase-shift keying), M-PSK (M-ary phase-shift keying), and/or M-QAM (M-ary quadrature amplitude modulation), to name but a few possibilities.

In an aspect, beamforming may be performed at the transmitting base station. Beamforming may take advantage of interference patterns to change the directionality of an antenna array. If transmitting, a beamformer circuit and/or process may control the phase or relative amplitude of a signal at a transmitter in order to create a desired pattern of constructive and destructive interferences in the wavefront. However, beamforming is merely an example technique that may be employed in a cellular network, and the scope of claimed subject matter is not limited in this regard.

In another aspect, mobile station 150 may receive the one or more data streams from base station 134, and may demodulate, de-interleave, and/or decode the received symbols in the data streams to recover signal information, including pilot signal information. Further, mobile station 150 may form a reverse link message for transmission to base station 134 for a data stream. The reverse link messages may comprise, for an example, various information regarding the communication link and/or the received data streams.

In an example, pilot signals may comprise primary and/or secondary synchronization signals, and in a further aspect pilot signals may comprise a position location pilot signal, discussed more fully below. Pilot signals may be utilized in one or more examples to search for and/or to acquire a cell.

Figure 3:
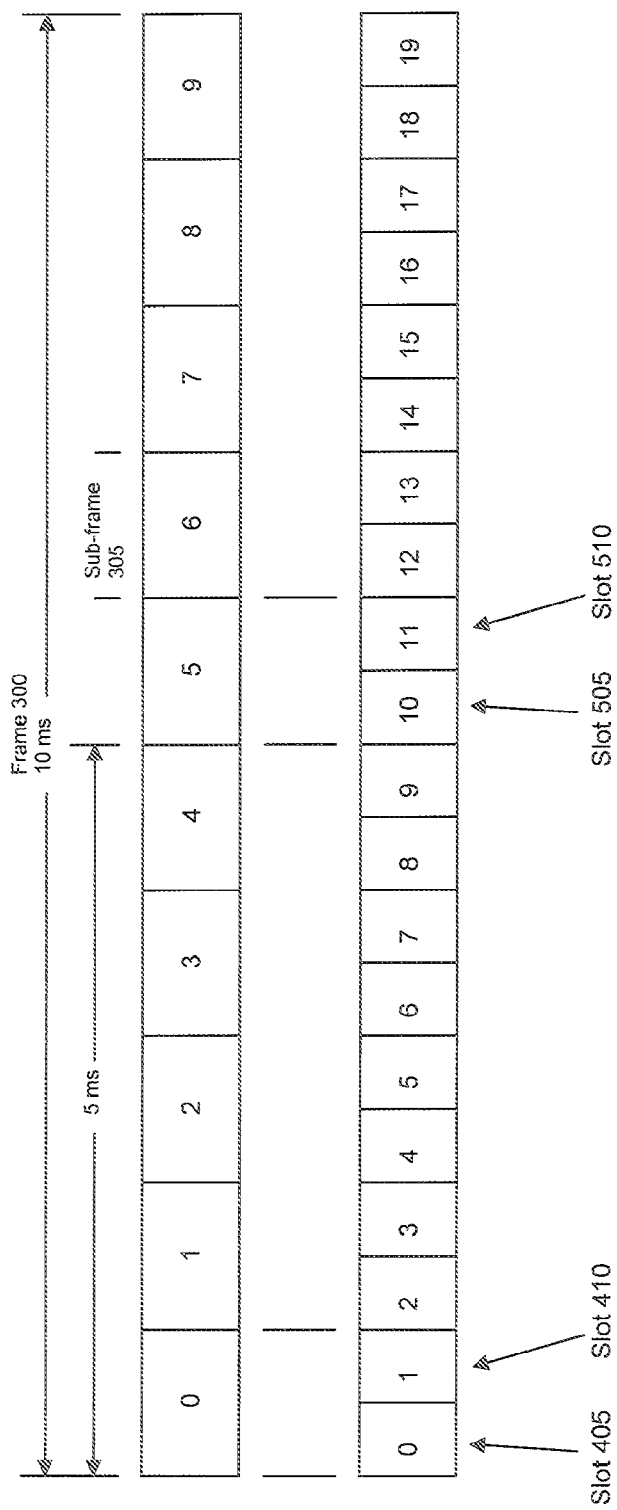
FIG. 3 is a diagram depicting an example Long Term Evolution (LTE) downlink frame.

FIG. 3 is a diagram depicting an example downlink frame 300 for an LTE communication network, such as, for example, network 120 depicted in FIG. 1. For this example, frame 300 comprises a duration of 10 ms, and may be divided into a number of sub-frames such as, for example, sub-frame 305. For this example, frame 300 comprises ten sub-frames. A sub-frame may, in turn, be divided into a pair of slots. For example, the $0^{th}$ sub-frame of frame 300 may comprise slot 405 and slot 410, discussed more fully below. Further, the $5^{th}$ sub-frame may comprise slot 505 and slot 510, also discussed more fully below. For this example, frame 300 may comprise a total of twenty slots.

Figure 4:
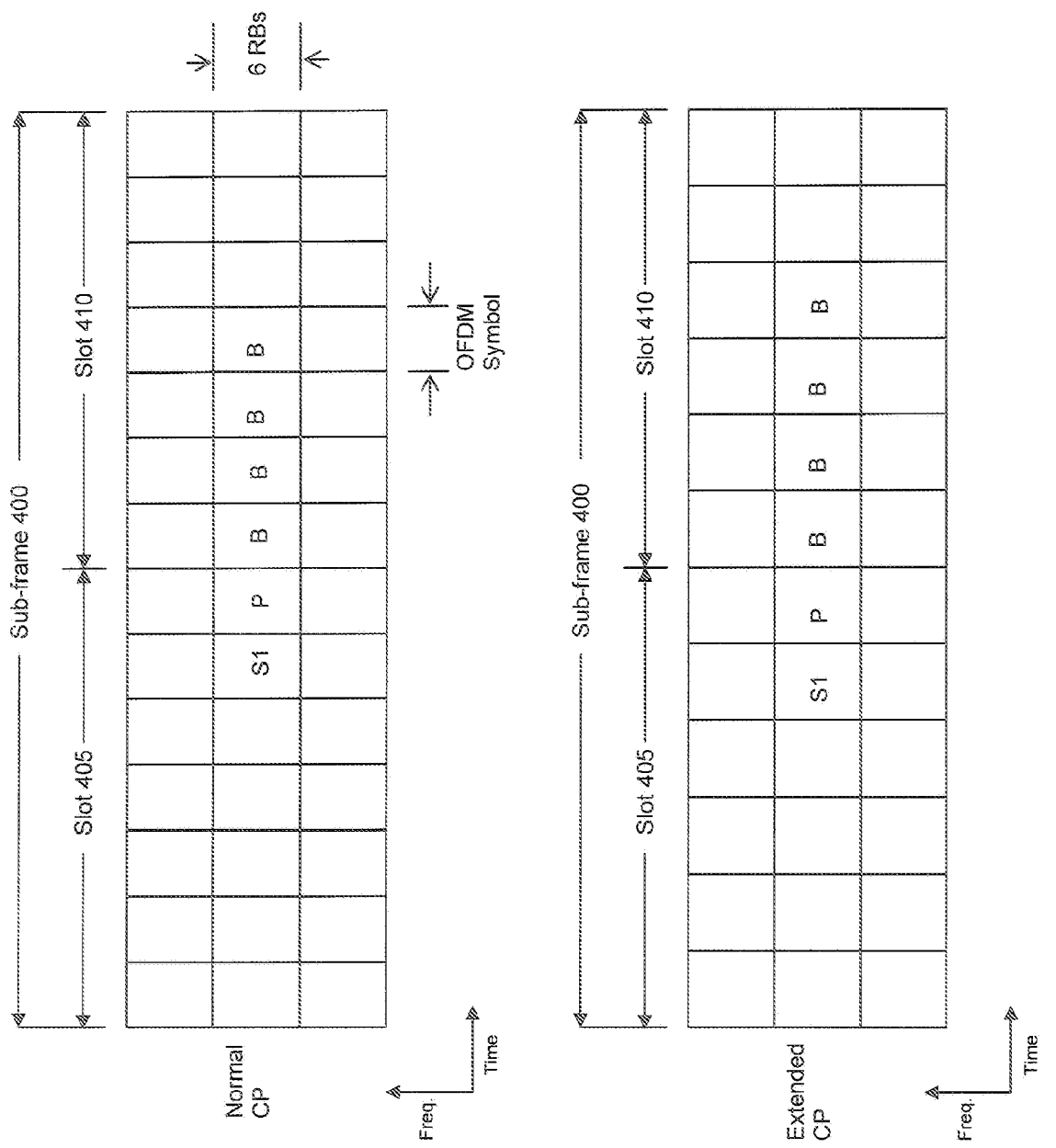
FIG. 4 is a diagram depicting an example LTE downlink sub-frame.

FIG. 4 is a diagram depicting sub-frame 400, including slots 405 and 410. In FIG. 4, two examples are provided. The topmost example depicts an arrangement of resource blocks (RBs) and OFDM symbols in the case of a normal cyclic prefix (CP). In general, for the examples described herein, a cyclic prefix may comprise a guard interval inserted prior to an OFDM symbol. For one example, OFDM symbols to be transmitted may comprise a broadcast channel (BCH, noted in sub-frame 400 by the reference letter "B"), a primary synchronization channel (PSC, noted in sub-frame 400 by the reference "P"), and a first secondary synchronization channel (SCC, noted in sub-frame 400 by the reference "S1"). In the bottom most example for FIG. 4, an arrangement of resource blocks and OFDM symbols is provided for the case of an extended cyclic prefix. The same B, S1, and P signals/channels found in the normal CP example may be found in the extended CP example. However, for the extended CP example, a slot may be divided into six OFDM symbol periods, as contrasted with seven OFDM symbol periods of a normal CP example.

Figure 5:
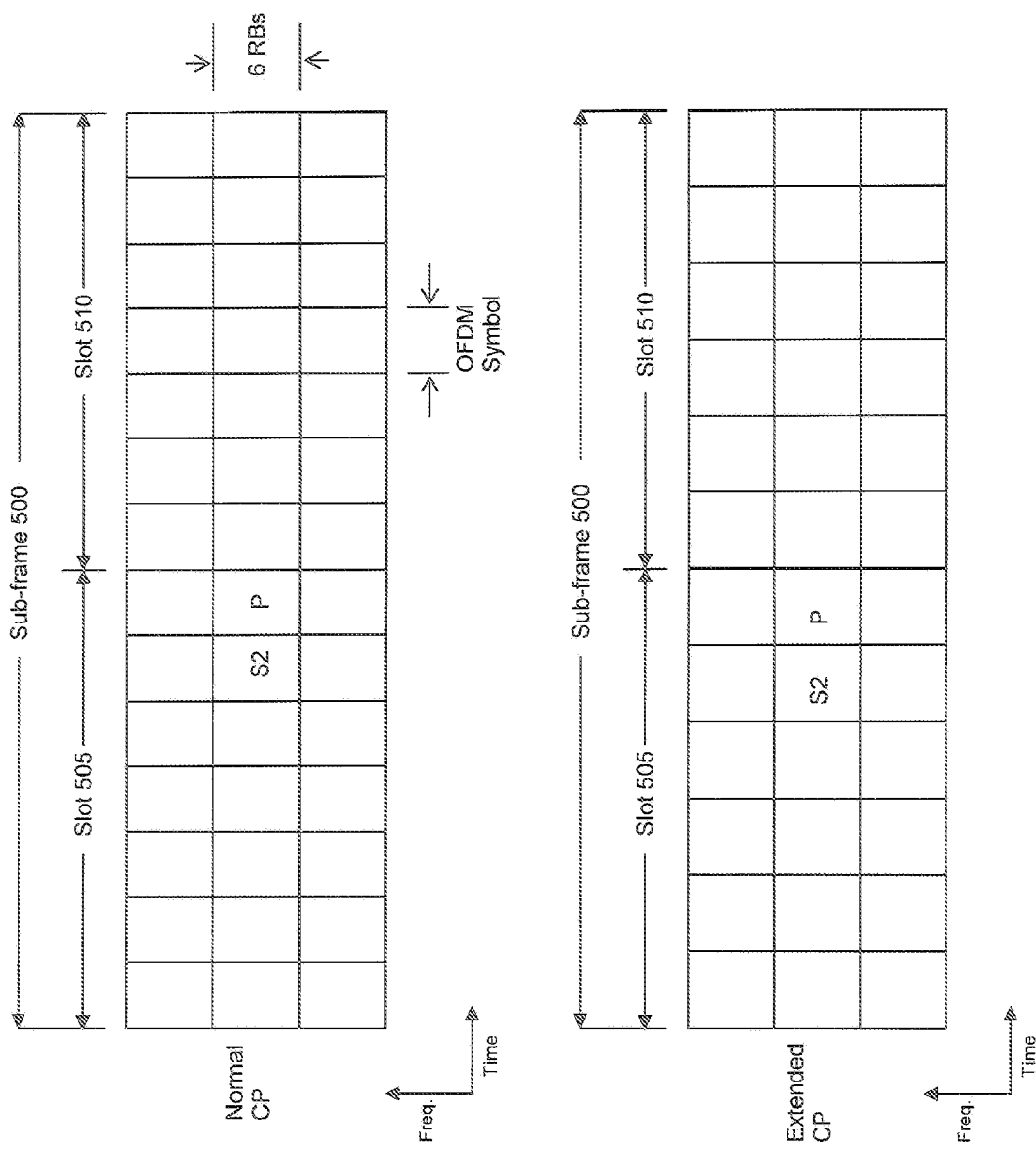
FIG. 5 is a diagram depicting an additional example of an LTE downlink sub-frame.

FIG. 5 is a diagram depicting sub-frame 500, including slots 505 and 510. In FIG. 5, as with FIG. 4, two examples are provided. The topmost example depicts an arrangement of resource blocks (RBs) and OFDM symbols in the case of a normal CP and the bottommost example is for the case of an extended CP. For these examples, OFDM symbols to be transmitted in sub-frame 500 may comprise the primary synchronization channel (PSC, noted in sub-frame 500 by the reference "P"), and a second secondary synchronization channel (SCC, noted in sub-frame 500 by the reference "S2"). The same S2 and P signals/channels found in the normal CP example may be found in the extended CP example.

As may be seen through observation of FIGS. 3-5, synchronization signals (PSC and/or SCC signals) may be transmitted in the $0^{th}$ and $5^{th}$ sub-frame in each frame. The synchronization symbols may be transmitted in the middle six resource blocks (centered at 1.08 MHz for this example), regardless of system bandwidth. In an aspect, the synchronization signals PSC and/or SCC may be used in time and/or frequency synchronization between a transmitting device and a receiving device, and may also identify OFDM symbol, slot, sub-frame, half-frame, and/or frame boundaries. The synchronization signals may further be utilized to identify cells, providing five-hundred ten cell identities, in one example. Further, for an example, the primary synchronization signal may identify a cell within a cell ID group, where one out of a possible three sequences are used in a cell of the group. In a further aspect, the synchronization signals may comprise Chu-sequences of length sixty three. In general, for one example, a Chu sequence may comprise a constant amplitude zero auto-correlation sequence. Also in an aspect, the primary synchronization signal may be transmitted in the last OFDM symbol of the $0^{th}$ and $5^{th}$ sub-frames, as depicted in FIGS. 4 and 5. The primary synchronization signal may be used as a phase reference for the secondary synchronization signals, in an example. For the secondary synchronization signals, three hundred forty different sequences may be possible. In an example, one hundred seventy sequences may be utilized to identify cell ID groups.

In one or more examples, the primary and secondary synchronization signals may be utilized in position location functions. However, these signals, as used above and as defined in the LTE specification, may not support robust position location determination capabilities. For example, there are only three primary synchronization channels defined. Therefore, the detection of far away cells may not work reliably. Also, non-coherent detection of the secondary synchronization channels may also not be adequate for detection of far away cells. In another aspect, system bandwidth is signaled over BCH. Only center frequency 1.08 MHz may be utilized for base station searches and/or detection. Further, the total energy of the pilot signals may be insufficient to overcome interference considerations. To improve position location operations while remaining compatible with and/or compliant with the LTE specification, several example techniques may be utilized. For example, single-frequency interference problems may be ameliorated by increasing the number of primary synchronization channel sequences to reduce the effect of the single-frequency interference issue. Similarly, the number of secondary synchronization channel sequences and/or symbols may be increased to increase energy in the secondary synchronization channel.

Another possible technique for improving position location performance in the environment of the present examples may include reuse on the secondary synchronization channels. Time reuse is discussed along with time and frequency reuse more completely below in connection with FIG. 6. In general, time and frequency reuse patterns may allow for increased bandwidth, and may also help provide improved performance at cell edges, as well as help to provide more uniform service across larger geographic areas. Still another possible technique for improving position location performance may comprise both increasing the number of primary and secondary synchronization symbols, as well as performing time and frequency reuse on the primary and secondary synchronization symbols.

Example techniques described herein may improve position location determination in cellular networks, such as those compatible with and/or compliant with the LTE specification discussed above. As previously mentioned in connection with FIG. 2, in an aspect, propagation delay information for signals communicated between a mobile station and one or more non-serving base stations may be received from the one or more non-serving base stations, and the position location determination may be based, at least in part, on the information received from the non-serving cells and further based, at least in part, on known position locations for the non-serving cells. Examples of such techniques are described in more detail below. In another aspect, an additional pilot signal, specified particularly for position location operations, may be implemented for one or more examples.

In an aspect, a dedicated pilot signal for position location operations may be referred to as a Position Location Pilot (PLP). The PLP for one example may comprise a signal that may be utilized in place of the primary and/or secondary synchronization signals discussed above in detecting base stations. For an example, a base station within a cellular network may transmit a particular PLP identifying that particular base station. Such pilot signals may be received at a mobile station, and, based on the particular PLP transmitted by the base stations, the mobile station may be able to determine which base stations in the cellular network are within range of the mobile station. Base station detection operations may, in an aspect, be performed over a wider bandwidth for systems supporting such bandwidths. For an example, the PLP may provide a low-overhead implementation, perhaps employing less than one percent of system bandwidth, although the scope of clamed subject matter is not limited in this respect. In utilizing a dedicated PLP, a low probability of single-frequency interference may be realized, and far-away base stations may be more readily detected, which may in turn allow for advanced downlink trilateration operations and more accurate and efficient position location determination.

For one example position location pilot signal, the first three symbols of a sub-frame, also referred to as a transmission time interval (TTI), for this example, may be designated for downlink control channels. In another aspect, a cell in a cellular system may use one of five hundred twelve Chu sequences for the PLP. For an example, the Chu sequences for the PLP may differ from those utilized for the primary synchronization signals. In another aspect, a cell of a cellular system may transmit PLPs according to either a time reuse pattern or a time and frequency reuse pattern.

In an aspect, for 1.25 MHz operation of an LTE compliant network, same length sixty-four Chu sequences may be transmitted in an OFDM symbol period where a PLP is transmitted. In another aspect, for 5 MHz operation of an LTE compliant network, same length three hundred Chu sequences may be transmitted in an OFDM symbol period where a PLP is transmitted. For an example implementation, mobile station 150 may be adapted to recognize possible locations, in terms of resource blocks and sub-frames, for example, for the various possible PLPs. Processing of the PLPs for an example may occur in a fashion similar to that of the primary synchronization channel signal.

In another aspect, PLP transmissions may be specified to occur among the various base stations in a cellular network according to a specified pattern. For this example, assume twenty five resource blocks and a 5 MHz system. In Table 1, below, resource blocks may be numbered where the center RB has a value of 0, and where higher frequency RBs are labeled with positive numbering, and further where lower frequency RBs are labeled with negative numbering. Also in the Table 1, PLP locations (RB, sub-frame) for a transmission are bolded. In an aspect, specified cells may not transmit a PLP in any other (RB, sub-frame) location. Further, Table 1, three frequency ranges are indicated, as are three time slots. Such a configuration may indicate a time and frequency reuse pattern, as discussed below in connection with FIG. 6. Also in Table 1, three cells are listed, and are labeled for this example, red (R), green (G), and blue (B), respectively. "Coloring", as it relates to cells, is discussed more fully below in connection with FIG. 6. Referring to FIG. 1, these cells may, for one example, correspond to base stations 132, 134, ad 136, respectively, although the scope of claimed subject matter is not limited in this respect. Further, three cells R, G, and B, may comprise three sectors, labeled for this example, α, β, and γ. In one example, base stations 132, 134, and 136 may comprise directional antennas to cover the specified sectors, although again, the scope of claimed subject matter is not limited in this respect.

TABLE 1

| PLP Transmission: | |
| --- | --- |
| Rα: | {([−3, +4], [−12, −5], [5, 12]), (1, 101, 201)} |
| Rβ: | {([−3, +4], [−12, −5], [5, 12]), (1, 101, 201)} |
| Rγ: | {([−3, +4], [−12, −5], [5, 12]), (1, 101, 201)} |
| Gα: | {([−3, +4], [−12, −5], [5, 12]), (1, 101, 201)} |
| Gβ: | {([−3, +4], [−12, −5], [5, 12]), (1, 101, 201)} |
| Gγ: | {([−3, +4], [−12, −5], [5, 12]), (1, 101, 201)} |
| Bα: | {([−3, +4], [−12, −5], [5, 12]), (1, 101, 201)} |
| Bβ: | {([−3, +4], [−12, −5], [5, 12]), (1, 101, 201)} |
| Bγ: | {([−3, +4], [−12, −5], [5, 12]), (1, 101, 201)} |

In Table 1, one may observe that, for one example, looking at the top row of the table, mobile station 150 may receive a PLP sequence from the "α" sector of cell R using resource blocks centered around the center RB frequency, as indicated by the [−3,+4] range, and located at a first sub-frame, as indicated by the value "1" for the sub-frame. The utilized frequency resource block range and sub-frame number are distinguished from the non-utilized frequency resource block ranges and sub-frame numbers by using different type-setting in Table 1. The second row of the table indicates that for this example, the same resource blocks may be utilized to receive transmission from the β sector of cell R, but at the $101^{st}$ sub-frame. The remainder of the table may be analyzed in a similar fashion. One may further note that for cell G, lower frequency resource blocks may be utilized, and that for cell B, higher frequency resource blocks may be utilized. In one or more examples, in the non-utilized frequency blocks and sub-frames, sectors may seize transmission in order to enhance the PLP detection performance, or the sectors may continue transmitting data or control signals at an appropriately limited power level, and/or the sectors may transmit data and control signals at the normal power level if the PLP detection performance can be otherwise ensured. It may also be noted that the same three sub-frames may be utilized for the cells, and that while mobile station 150 may be receiving a PLP, or is checking for the presence of a PLP from the "α" sector of cell R, mobile station 150 may also be concurrently receiving, or concurrently checking for the presence of other PLPs from the "α" sectors of cells G and B. The example PLP transmissions described above do not interfere with each other due to the above-described disjoint frequency range assignment.

Figure 6:
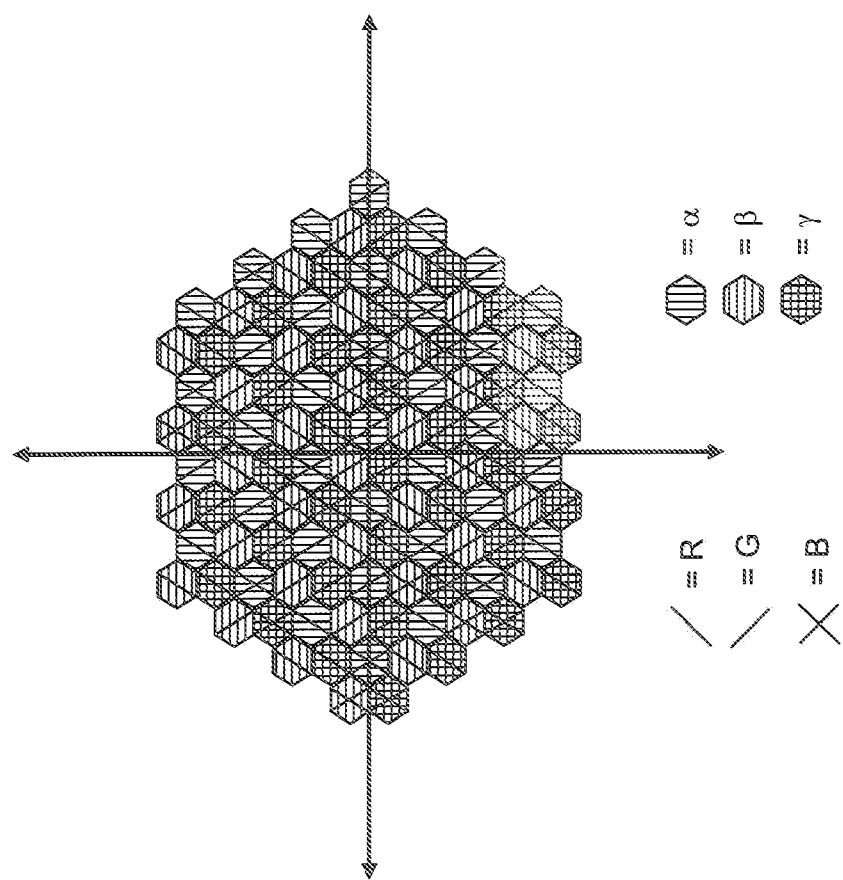
FIG. 6 is a diagram depicting an example time and frequency reuse pattern for a position location pilot signal.
Figure 6:
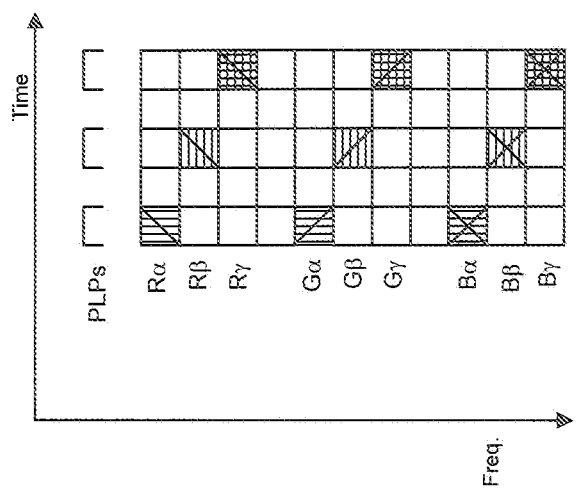

FIG. 6 is an illustration depicting a time and frequency reuse pattern, and is an additional illustration to the information presented in Table 1. In general, time and frequency reuse patterns may provide power allocation patterns to various cells and sectors within cells in order to minimize interference problems. In other words, by partitioning sectors so that the transmitted signal waveforms are nearly mutually orthogonal results in pilot signals that are more easily detected by a mobile station, for example.

Partitioning of sectors for ease of discussion may be referred to herein as "coloring," although the use "colors" is, of course, not a necessary feature of claimed subject matter or even of this particular embodiment. Rather, the term "color" is intended here to identify partitions or partitioning. Thus, "color" here merely designates a partition, which for a sector, for example, refers to a 2tuple, rather than the conventional notion of color. For example, and without limitation, if we let a cell take on a value from the set {Red, Green, Blue} (abbreviated as {R, G, B}), a sector may, in this example, take on a value from the set {R, G, B}x{α, β, γ}, where "x" stands for Cartesian product. Thus, in this example, the "color" of the cell influences the "color" of the sectors of that cell. However, as indicated above, the color of a sector may be referred to as a 2tuple, for example (R, α) abbreviated as Rα, the first element, again, coming from the color of the cell to which the sector belongs.

As noted above, for an example, a cell may be colored R, G, or B, and a cell may comprise three sectors, labeled α, β, and γ. For this example, the reuse factor between cells may comprise 3, and within the cells the reuse factor may also comprise 3, with the α, β, and γ sectors sharing three frequencies and three time periods. Based at least in part on the discussion above, it should now be apparent that the reuse factor for this particular example is K=9 or ⅑.

Although Table 1 and FIG. 6 describe an example time and frequency reuse technique, other examples may employ a time reuse technique, with no frequency reuse. Still other examples may not employ any reuse techniques. Further, the specific time and frequency reuse techniques described herein are merely example techniques, and the scope of claimed subject matter is not limited in this respect. Other examples may implement other time reuse or time and frequency reuse techniques, including random time and/or time-frequency reuse techniques In at least some of the examples that follow, example techniques may be described where propagation delay information may be received from non-serving cells. Further examples may be described wherein a dedicated PLP may be utilized. As with many of the examples above, the examples that follow may utilize an LTE compliant cellular network, although the scope of claimed subject matter is not limited in this respect. Further, for one or more examples, communications between mobile stations and base stations may in some cases adhere to the LTE specification, while for other examples, communications between mobile stations and base stations may deviate at least in part from the LTE specification.

In general, position location determination operations may be either network initiated or mobile station initiated. Examples of network initiated position location determination operations may include, but are not limited to, people tracking (such as, for example, children), and/or property tracking where the individual desiring the position location determination is not the subject of the tracking. Examples of mobile-device initiated position location applications may include, but are not limited to, applications where the initiator desires information regarding his/her own location. One such possible application may comprise a navigational application, although, again, the scope of claimed subject matter is not limited in this respect.

In an aspect, network initiated position location operations may be implemented using a position determination entity (PDE), such as entity 140 depicted in FIG. 1. PDE 140 may receive information from mobile station 150, may determine the location of the mobile station 150, and may provide the solution to mobile station 150, for an example. In another aspect, mobile station-initiated position location determination operations may rely on mobile station 150 to gather propagation delay information from one or more base stations and/or one or more satellites, and may perform the position location determination calculations at mobile station 150. In such a case, mobile station 150 may have stored thereon additional information regarding satellite positions, base station position locations, etc. In yet another aspect, PDE 140 may store SPS almanac and ephemeris information, base station latitude and longitude information, etc. Such information may be shared by the PDE to mobile station 150 as needed. Also, in an aspect, SPS assistance data may be transmitted over LTE broadcast channels, for an example. Such a broadcast may reduce the load on the air-interface by avoiding unicast transmission to a large number of mobile stations, for example.

To generate a position location fix, mobile station 150 and/or PDE 140 may utilize any of a number of different propagation delay measurements, depending on the particular implementation and depending on circumstances. The propagation delay information may be utilized along with known position locations for one or more base stations to determine the position location of mobile station 150. Example measurement types may include SPS measurements, observed time difference of arrival (OTDOA) estimates, and round trip delay (RTD) estimates.

Position location determinations based on OTDOA may comprise, for an example, transmitting a signal from a transmitting device and receiving the signal at three or more receiver sites. For an example, the transmitting device may comprise mobile station 150, and the receiver sites may comprise base stations 132, 143, and 136, as well as for an example an additional base station (not shown). If a signal pulse is transmitted from mobile station 150, it will arrive at slightly different times at spatially separated base stations 132 and 134. The OTDOA for this example is a result of the different distances of the base stations from mobile station 150. Given two known receiver locations and a known OTDOA, the locus of possible mobile station locations may comprise one half of a two-sheeted hyperboloid. In other words, with two receivers at known locations, an transmitter such as mobile station 150 may be located onto a hyperboloid.

If a third receiver such as base station 136 for this example is introduced, a second OTDOA measurement may be obtained, and the transmitting mobile station 150 may be located on a second hyperboloid. The intersection of these two hyperboloids describes a curve on which mobile station 150 may be located.

If a fourth base station is used to produce a third OTDOA measurement, the position location of mobile station 150 may be fully determined. The position location determination for this example may be performed by one or more of the base stations, and/or may be performed by another network entity such as, for example, position determination entity 140. The results of the position location determination operation may be communicated to mobile station 150 through one of the base stations, for an example.

Although this example describes mobile station 150 transmitting a signal to multiple base stations, and also describes the OTDOA measurements and position location determination operations performed at the base stations and/or at other network entities, the scope of claimed subject matter is not limited in this respect. Other examples may comprise various base stations transmitting signals at substantially the same time, and the OTDOA measurements may be made at mobile station 150 in response to receiving the signals. Mobile station 150 may compute OTDOA measurements, and may perform position location determination operations if mobile station 150 has access to position location information for the base stations, for example.

For OTDOA measurements, one goal may be to attempt to locate as many base stations as possible in order to promote more accurate position location determinations. Message types that may be implemented in a cellular network, such as network 120, to accommodate OTDOA measurements may comprise a message from mobile station 150 to base station 134 requesting an OTDOA estimate, and a response message from base station 134 to mobile station 150 containing the OTDOA estimate. In one example, the response message from base station 134 may also include downlink metrics. These messages are merely examples of message types that may be implemented in a cellular network to facilitate OTDOA measurements, and the scope of claimed subject matter is not limited to these specific examples.

In one aspect, a PLP may be utilized to locate and/or identify one or more cells. One or more of the cells may comprise non-serving cells. OTDOA estimates received from a number of cells may improve the accuracy of the position location. A PLP may aid in locating a larger number of cells than might be possible using primary and secondary synchronization channel signals. For example, even if transmission strength and interference concerns are not issues, an LTE compliant network would only permit the mobile station to be active in one cell at a particular time.

In another aspect, for an asynchronous system for which accurate SPS timing reference signals and information are not available, a network device comprehending timing differences for various base stations in the system may resolve the OTDOA. For a position location determination, a network entity such as PDE 140 may be utilized, for example. In another aspect, if mobile station 150 is provided with base station timings and the base stations' position location information, mobile station 150 may perform OTDOA calculations. In at least some implementations, cellular network designers and/or managers may not prefer to broadcast base station location information to mobile stations. In such a case, PDE 140 may perform OTDOA calculations, and may provide results to mobile station 150.

For RTD measurements, a number of different message types may be implemented in a cellular network to facilitate RTD measurement. Example messages may include, but are not limited to, a request from mobile station 150 to base station 134 for round-trip delay estimates from base station 134, and a response message from base station 134 to mobile station 150 containing the RTD estimate. In another example, PDE 140 or some other network entity may request RTD estimates from non-serving cells, and in yet a further example, and as is discussed in more detail below, mobile station 150 may request RTD estimates from non-serving cells.

As previously mentioned, in an LTE compliant cellular system, a mobile station such as station 150 may maintain an air-link with a single cell within the network, and may obtain an RTD estimate from that single cell. In the event of a synchronous system implementation, and if enough satellites are "visible", a single RTD estimate from the single serving cell may be sufficiently accurate for a position location determination. However, for asynchronous system implementations, or in situations where adequate SPS information is not available, mobile device 150 may request an RTD estimate from one or more non-serving cells.

In one aspect, mobile device 150 may request discontinuous receive (DRX) and/or discontinuous transmit (DTX) intervals from the serving cell to enable mobile station 150 to transmit on a random access channel (RACH) to a non-serving cell. For this example, an RACH signal may be transmitted to the non-serving cells, and a response from the non-serving cells to the $1^{st}$ message in the RACH sequence may indicate an uplink timing adjust parameter for the non-serving cell. This uplink timing value may be used as an RTD estimate, for this example. Also for an example, a RACH signal may be referred to as an "access probe" signal. For another example, other dedicated resources, perhaps similar to RACH, may be utilized for the RTD measurement to avoid the use of RACH.

In a further aspect, an RTD estimate may be requested of a serving cell. In this situation, the base station may transmit relatively accurate and/or relatively precise RTD information if a position location application is enabled. In one aspect, a position location application may comprise a plurality of instructions executed on a processor of a mobile station to direct the mobile station to perform position location operations. In one example, a desired resolution for the RTD measurement/estimate may be approximately $\frac{1}{16}^{th}$ of 0.52 µs, which may represent a defined uplink timing adjust resolution for LTE.

Figure 7:
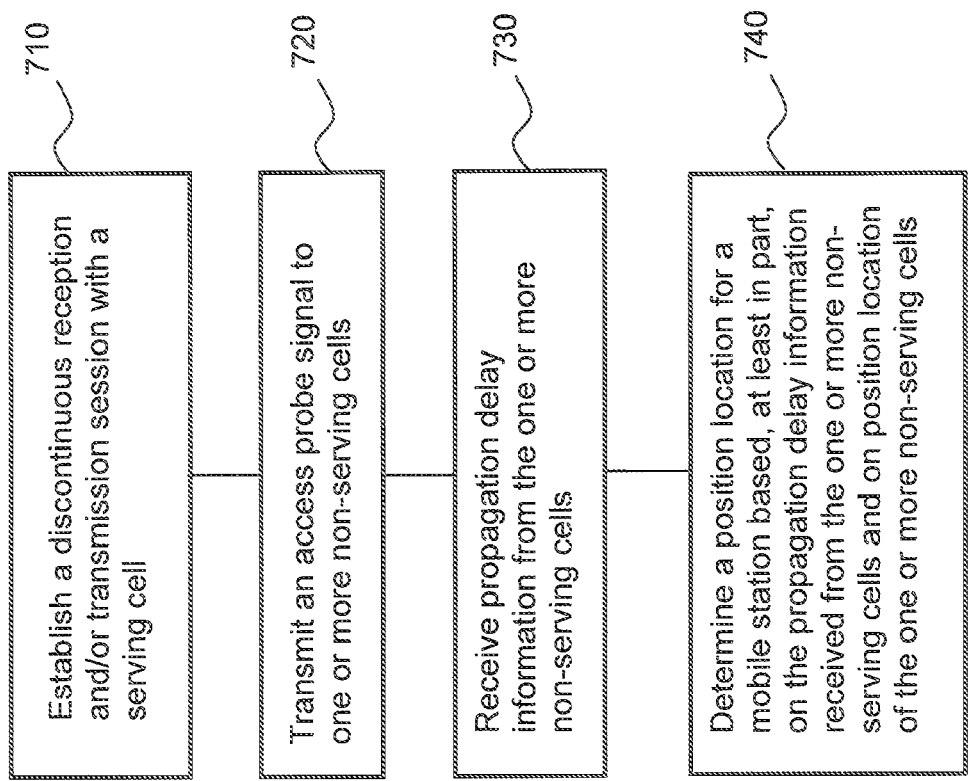
FIG. 7 is a flow diagram of an additional example method for determining position location for a mobile station.

FIG. 7 is a flow diagram of an additional example method for determining a position location for a mobile station. At block 710, a discontinuous receive/discontinuous transmit (DRX/DTX) session may be established with a serving cell. At block 720, an access probe signal may be transmitted to one or more non-serving cells, and at block 730 propagation delay information may be received from the one or more non-serving cells. At block 740, a position location for a mobile station may be determined based, at least in part, on the propagation delay information received from the one or more non-serving cells and further based, at least in part, on known position locations for the one or more non-serving cells. Examples in accordance with claimed subject matter may include all, more than all, or less than all of blocks 710-740. Also, the order of blocks 710-740 is merely an example order. Further, the flow diagram of FIG. 7 is merely an example technique for determining position location for a mobile station, and claimed subject matter is not limited in this respect.

In another aspect, non-serving cells may establish communication with a mobile station for position location purposes using a PLP signal, such as, for an example, an example PLP sequence described above, although the scope of claimed subject matter is not limited in this respect. The PLP signal may allow the mobile station to identify and/or communicate with particular base stations among the various base stations within a cellular network.

Figure 8:
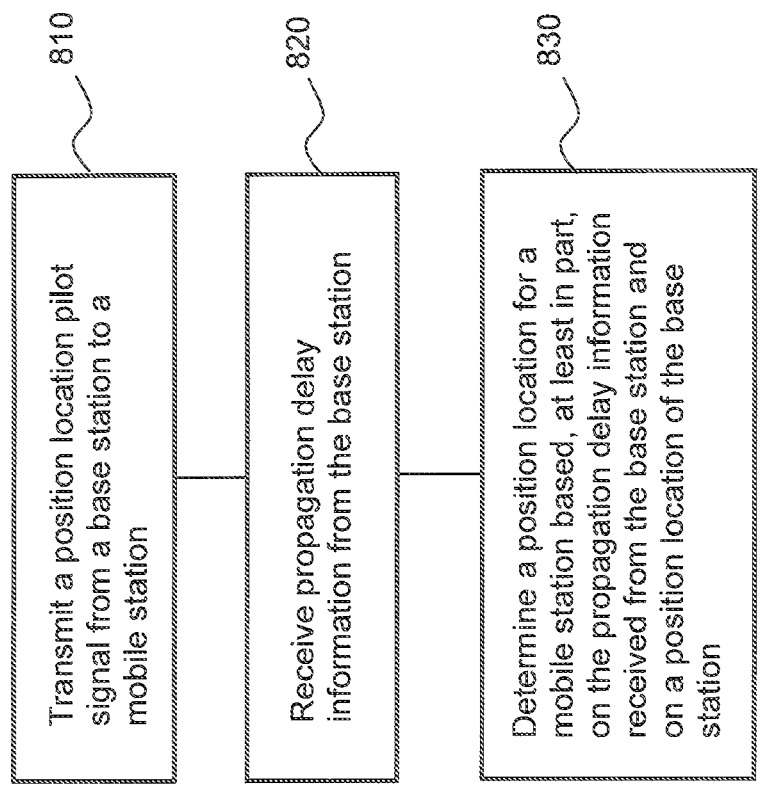
FIG. 8 is a flow diagram of an additional example method for determining position location for a mobile station, including transmitting a position location pilot signal.

FIG. 8 is a flow diagram of an additional example method for determining a position location for a mobile station, including receiving a position location pilot signal. At block 810, a position location pilot signal may be transmitted by a base station and received at the mobile station. At block 820, propagation delay information may be received from the base station, and at block 830, a position location for the mobile station may be determined based, at least in part, on the propagation delay information received from the base station and further based at least in part on a known position location for the base station. For another example, the propagation delay information received from the base station may be utilized in conjunction with information from other base stations and/or with information from an SPS to determine the position location for the mobile station. Examples in accordance with claimed subject matter may include all, more than all, or less than all of blocks 810-830. Also, the order of blocks 810-830 is merely an example order. Further, the flow diagram of FIG. 8 is merely an example technique for determining position location for a mobile station, and claimed subject matter is not limited in this respect.

Figure 9:
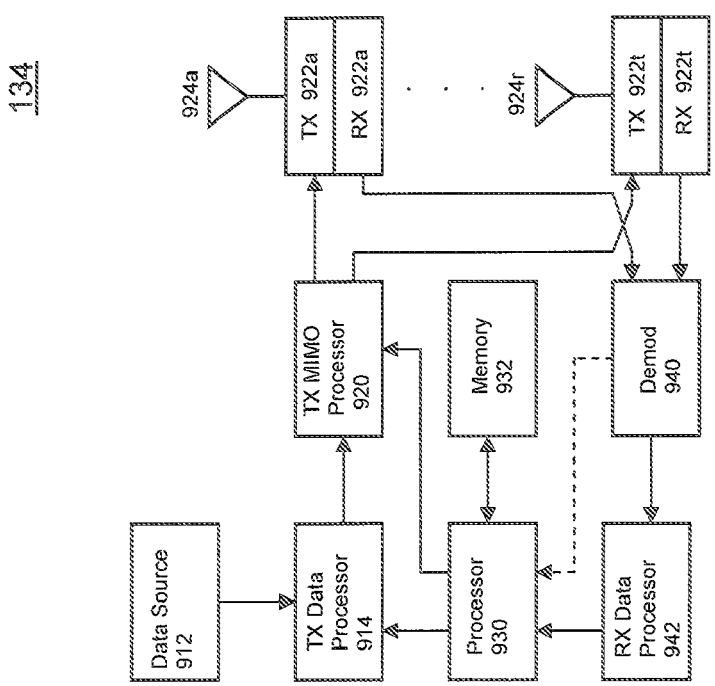
FIG. 9 is a block diagram of an example base station.

FIG. 9 is a block diagram of an example implementation of base station 134. As previously discussed, in one aspect, base station 134 may be implemented to operate in a multi-input/multi-output system. Base station 134 may deliver source data 912, including any of the various signals, sequences, symbols, messages, etc., described herein. A transmit (TX) data processor 914 may be adapted to format, code, and/or interleave source data for one or more data streams according to appropriate schemes for a data stream. In an aspect, transmit data processor 914 may be adapted to operate in accordance with a wide range of schemes and/or protocols. In another aspect, the particular schemes used may be specified by processor 930, and in particular may be specified according to instructions stored in memory 932, and executed on processor 930 to direct the operation of TX data processor 914 and a TX MIMO processor 920. TX MIMO processor 920 may provide one or more of $N_t$ modulated symbol streams to a corresponding one or more $N_t$ transmitters, labeled TX 922a-922t. In another aspect, TX MIMO processor 920 may apply beamforming weights to the symbols of the data streams and to the antennas from which the symbols are to be transmitted. Further, TX MIMO processor 920 may deliver a number of symbol strings to TX 922a-922t. One or more of TX 922a-922t may convert the symbol strings into analog signals suitable for transmission via one or more antennas 924a-924t. One or more of TX 922a-922t may further amplify, filter, upconvert, etc., the analog signals prior to transmission.

Figure 10:
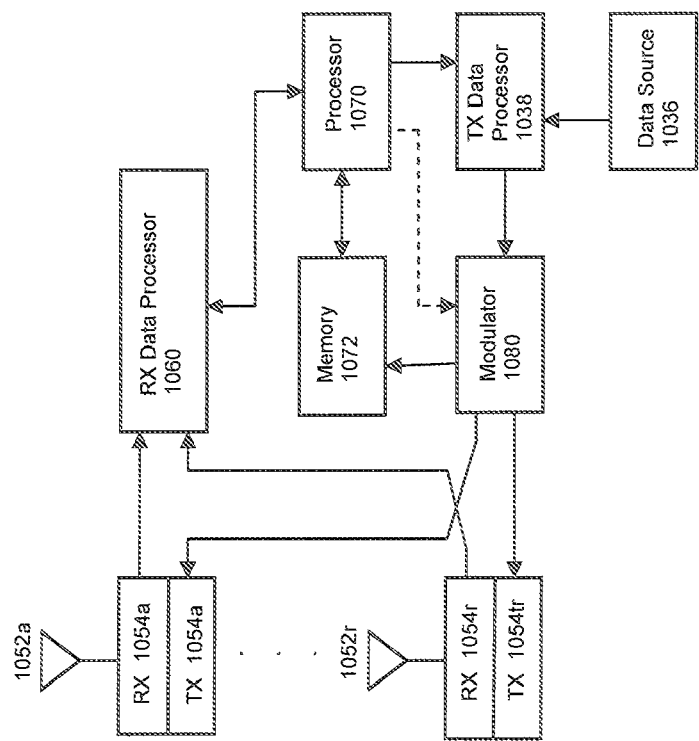
FIG. 10 is a block diagram of an example mobile station.

FIG. 10 is a block diagram of an example implementation of mobile station 150. At mobile station 150, for this example, signals transmitted by base station 134 may be received at one or more antennas 1052a-1052r, and the received signals may be delivered through one or more of receivers RX 1054a-1054r and provided to RX data processor 1060. At receivers 1054a-1054r, the received analog signals may undergo analog-digital conversion, and may further process the digitized signals into one or more appropriate digital symbol streams. For this example, base station 134 may comprise a processor 1070 that may formulate a reverse link message that may comprise, for example, various types of information regarding a communication link and/or a received data stream. The reverse link message may be processed by a TX data processor 1038, which may also receive data from other sources, such as, for example, from data source 1036. The reverse link message may be modulated by a modulator 1080, and may be conditioned by one or more of TX 1054a-1054r, and may be transmitted back to mobile station 150 via one or more of antennas 1052a-1052r At mobile station 150, the reverse link message may be received at one or more of antennas 924a-924t, may be conditioned at one or more of RX 922a-922t, and may be delivered to a demodulator 940. The reverse link message may further be delivered to an RX data processor 942 and to processor 930. Processor 930 may utilize the information in the reverse link message to make determinations regarding future transmissions, including, for example, beamforming weights and/or coding matrices.

For the example base station 134 and example mobile station 150 described above, particular configurations and/or arrangements of components are mentioned. However, these are merely example base stations and mobile stations, and a wide range of other implementations of these devices may be utilized in accordance with claimed subject matter. Further, the types of functionality and/or circuitry described in connection with these examples may find utility in any of a wide range of digital electronic devices, and are not limited to merely mobile stations and base stations.

Also, the discussions above make frequent mention of the LTE specification, and of LTE compliant networks. However, in at least some of the examples described above, variations from the LTE specification may be implemented to better support position location determination operations. In general, the variations from the LTE specification may comprise the creation of a dedicated pilot signal (PLP) for position location. Examples of time and frequency locations for the PLP sequences are described above, as are Chu sequences used for a PLP. Further, to again better support position location determination operations, several additional system messages are described. Examples of these messages may comprise mobile station requests for RTD estimates with application configured periodicity, and base station responses with RTD estimates. For downlink measurements, example messages may comprise base station requests for downlink measurement metrics, and mobile station responses with the downlink measurement metrics. Yet additional messages may comprise DRX interval requests connected with a position location application.

Such DRX interval messages may comprise, for example, base station initiated and/or mobile station initiated requests.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, comprising:
   establishing a discontinuous receive/discontinuous transmit (DRX/DTX) session with a serving cell;
   transmitting, from a mobile station, an access probe to one or more non-serving cells during the DRX/DTX session;
   receiving, at the mobile station, propagation delay information from at least one of the one or more non-serving cells responsive to the access probe; and
   obtaining a position location for the mobile station, the position location being determined based, at least in part, on the propagation delay information.

2. The method of claim 1, further comprising transmitting, from the mobile station, the propagation delay information to the serving cell.

3. The method of claim 2, wherein determining the position location for the mobile station comprises receiving, at the mobile station, the position location for the mobile station from the serving cell.

4. The method of claim 1, further comprising receiving, at the mobile station, a message from the serving cell to initiate a position location determination.

5. The method of claim 4, wherein the access probe is transmitted responsive to the message from the serving cell to initiate the position location determination.

6. A mobile station comprising:
   memory;
   a receiver;
   a transmitter; and
   a processor coupled to the receiver, the transmitter and the memory, wherein the processor and memory are configured to:
   establish a discontinuous receive/discontinuous transmit (DRX/DTX) session with a serving cell;
   initiate transmission, via the transmitter, of an access probe to one or more non-serving cells during the DRX/DTX session;
   receive, via the receiver, propagation delay information from at least one of the one or more non-serving cells responsive to the access probe; and
   obtain a position location for the mobile station, the position location being determined based, at least in part, on the propagation delay information.

7. The mobile station of claim 6, wherein the processor and memory are further configured to:
   initiate transmission, via the transmitter, of the propagation delay information to the serving cell; and
   obtain, via the receiver, the position location for the mobile station from the serving cell.

8. The mobile station of claim 6, and wherein the processor and memory are further configured to:
   obtain, via the receiver, a message from the serving cell to initiate a position location determination; and
   initiate transmission, via the transmitter, of the access probe to the one or more non-serving cells in response to the message from the serving cell to initiate the position location determination.

9. An apparatus for use in a mobile station, the apparatus comprising:
   means for establishing a discontinuous receive/discontinuous transmit (DRX/DTX) session with a serving cell;
   means for transmitting an access probe from the mobile station to one or more non-serving cells during the DRX/DTX session;
   means for receiving, at the mobile station, propagation delay information from at least one of the one or more non-serving cells responsive to the access probe; and
   means for obtaining a position location for the mobile station, the position location being determined based, at least in part, on the propagation delay information.

10. The apparatus of claim 9, and further comprising:
    means for transmitting the propagation delay information from the mobile station to the serving cell; and
    means for receiving, at the mobile station, the position location for the mobile station from the serving cell.

11. The apparatus of claim 9, and further comprising:
    means for receiving, at the mobile station, a message from the serving cell to initiate a position location determination; and
    wherein the means for transmitting an access probe from the mobile station to one or more non-serving cells is response to the message from the serving cell to initiate the position location determination.

12. An article, comprising:
    a non-transitory storage medium having stored thereon machine-readable instructions executable by a processing circuit of a mobile station to cause the mobile station to:
    establish a discontinuous receive/discontinuous transmit (DRX/DTX) session with a serving cell;
    transmit an access probe to one or more non-serving cells associated with one or more of the received position location pilot signals during the DRX/DTX session;
    receive propagation delay information from at least one of the one or more non- serving cells responsive to the access probe; and
    obtain a position location for the mobile station, the position location being determined based, at least in part, on the propagation delay information.

13. The article of claim 12, wherein the machine-readable instructions are further executable by the processing circuit of the mobile station to cause the mobile station to:
    transmit the propagation delay information to the serving cell; and
    receive the position location for the mobile station from the serving cell.

14. The article of claim 12, wherein the machine-readable instructions are further executable by the processing circuit of the mobile station to cause the mobile station to:
    receive a message from the serving cell to initiate a position location determination; and
    transmit the access probe to the one or more non-serving cells in response to the message from the serving cell to initiate the position location determination.

* * * * *